Sept. 4, 1962   J. M. AVERITT   3,052,124
LINEARIZING CIRCUIT FOR RESISTANCE THERMOMETER
Filed Nov. 30, 1960
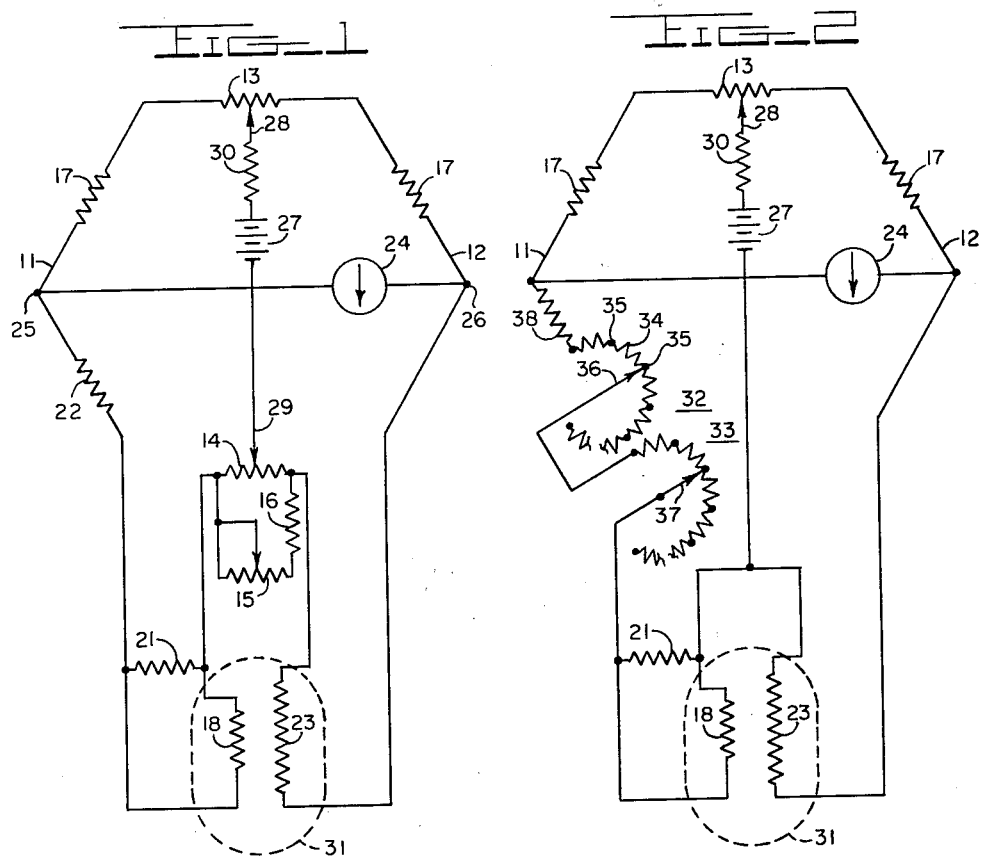
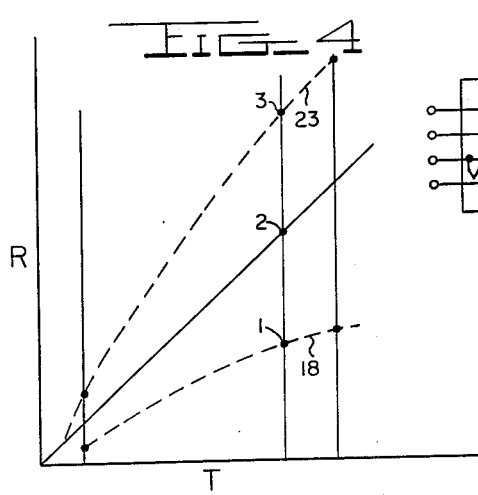
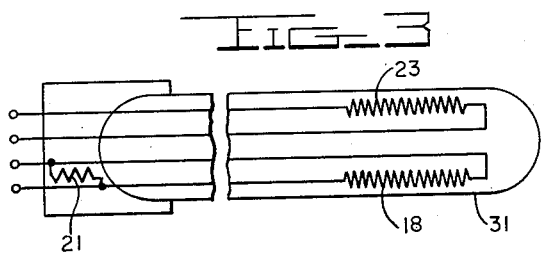
INVENTOR
J. MALCOLM AVERITT
BY
ATTORNEY United States Patent Office 3,052,124
Patented Sept. 4, 1962

3,052,124
LINEARIZING CIRCUIT FOR RESISTANCE
THERMOMETER
Jules Malcolm Averitt, Washington, D.C., assignor to the United States of America as represented by the Secretary of the Navy
Filed Nov. 30, 1960, Ser. No. 72,813
9 Claims. (Cl. 73—362)
(Granted under Title 35, U.S. Code (1952), sec. 266)

The invention described herein may be manufactured and used by or for the Government of the United States of America for governmental purposes without the payment of any royalties thereon or therefor.

The persent invention relates to resistance thermometers and more particularly to a linearizing circuit for resistance thermometers.

Heretofore resistance thermometers have been developed to provide a linear relationship between temperature and resistance in which the sensing element is positioned in one arm of a Wheatstone bridge and designed with resistors of copper and nickel wire in series. The resistance of each of the resistors is chosen so that the nonlinear characteristic of one of the metals is canceled out by the other. Such thermometers provide a fairly linear measurement, deviating less than 0.03° C. over a temperature range of −90° C. to +50° C.; however the calibration is not constant over a period of time. Other resistance thermometers include sensing elements formed of a single metal such as copper, nickel, platinum or other materials having suitable characteristics. Such thermometers are not linear since the resistance change per degree of temperature change is not equal in amounts over the entire temperature range. It is necessary to correct for nonlinearity by an approximate means such as a nonlinear dial, a nonlinear bridge circuit, a nonlinear potentiometer, or by a specially shaped cam used in the system.

It is therefore an object of the present invention to provide a resistance thermometer which has substantially a linear response over a temperature range from about −90° C. to about +50° C.

Another object is to provide a resistance thermometer which requires no calibration tables or curves during the assembly or use thereof.

While another object is to provide a resistance thermometer which has a deviation from linear of less than 0.01° C. over the operating temperature range.

Still another object is to provide a resistance thermometer sensor element which can be used with different types of well-known equipment.

Yet another object is to provide a device which presents an accurate, direct reading of the temperature within a specified range.

Other objects and advantages of the invention will hereinafter become more fully apparent from the following description of the annexed drawings, which illustrate a preferred embodiment, and wherein:

FIG. 1 illustrates a Wheatstone bridge circuit including the resistance elements and temperature indicating means of the present invention;

FIG. 2 illustrates a modification of FIG. 1.

FIG. 3 illustrates the temperature sensing probe, including the sensing elements; and FIG. 4 is a graph illustrating the resistance curve for each of the individual sensing elements and a linear line representative of the net resistance of the resistance thermometer of the present invention at a given range of temperature.

The present invention is directed to a linearizing circuit for resistance thermometers which incorporates in a Wheatstone bridge a linear resistance sensor having two separate platinum windings or any other suitable metal of different resistance values or any other suitable metal which has a temperature coefficient of resistance which decreases with temperature at a rate similar to that of platinum. The windings are connected in adjacent arms of the Wheatstone bridge and physically positioned in parallel relationship in a bulb or probe, the winding having the lesser resistance being shunted by a fixed resistor. In use of the device the resistance windings lying in the bulb will be affected equally by the temperature of the medium surrounding the bulb or probe, resulting in a resistance difference of the two different windings which will be relative to the temperature of the medium. The change of resistance value in the windings caused by the surrounding temperature causes a different current flow in each arm of the Wheatstone bridge such that the bridge becomes unbalanced. A galvanometer or other null detector connected across the Wheatstone bridge will respond to the potential difference to indicate an unbalanced condition. A slider of a potentiometer connected in the current supply line of the Wheatstone bridge can be adjusted manually or by a servo mechanism to balance the Wheatstone bridge circuit. The distance through which the slider is moved in order to balance the bridge circuit is calibrated in degrees of temperature to indicate the temperature of the medium affecting the resistance change in the sensor.

Now referring to the drawings, FIG. 1 illustrates an electrical circuit in the form of a Wheatstone bridge which has arms 11 and 12 joined at one end by a potentiometer 13 and at the other end by a Helipot network. The Helipot network includes a balancing potentiometer 14 connected in parallel with a combination of a calibrating potentiometer 15 connected in series with a fixed resistor 16. Arm 11 of the Wheatstone bridge includes a fixed resistor 17 in one portion and in the other portion of the arm a platinum sensor resistance winding 18 which is shunted by a fixed resistor 21 and connected in series with fixed resistor 22. Arm 12 includes in one portion a fixed resistor 17 and in the other portion a platinum sensor resistance winding 23.

A null detector 24 is connected in a line connected to arm 11 between the fixed resistors 17 and 22 at 25 and to arm 12 between fixed resistor 17 and the platinum winding 23 at 26. A power input source 27 is connected to the sliding contacts 28 and 29 of the pontentiometers 13 and 14 and includes in the line a current limiting resistor 30. The sliding contact 29 is hand or motor driven along the potentiometer 14 to balance the Wheatstone bridge circuit and provide a null to galvanometer or amplifier input, the distance of movement of the sliding contact 29 on the winding 14 is calibrated to indicate the temperature determined by the sensor resistance windings 18 and 23. The sliding contact of potentiometer 15 can be adjusted for the required sensitivity or to bring sliding contact 29 into agreement with a digital indicator geared to the sliding contact. Slider 28 is adjustable to give a shift of zero commensurate with the net resistance of the sensor at zero degrees centigrade.

FIG. 3 illustrates a sensor probe in which the platinum resistance windings 18 and 23 of the separate arms 11 and 12 are positioned in parallel relationship physically within an elongated tubular member or bulb 31. Thus both of the resistance windings will be maintained at the same temperature but will have different resistance changes since one winding has a greater resistance than the other.

FIG. 4 illustrates a graphic presentation of a curve made by plotting the temperature vs. resistance for each of the resistance windings 18 and 23 shown by dashed lines and by a solid line for the net resistance of the combination of the resistance windings 18 and 23. As shown by the graph, each of the resistance windings gives the nonlinearity characteristic of platinum, but a system with a combination of the two windings as shown will provide a linear response as indicated by the heavy solid line. The heavy solid line is found by subtracting the value of curve 18 from the value of curve 23 along the same vertical line such as, for example, subtracting point 1 from point 3 gives point 2.

When the resistance of winding 18 is between 0.22 and 0.34 times the resistance of winding 23, the resistance value of the shunt resistor 21 can be found by the formula $H=20.52Y-4.09X$ where H is the resistance value of the shunt resistor 21 and Y and X are the resistance values at 0° C. of resistance windings 18 and 23 respectively. It has been determined that H is about six times the zero degree centigrade resistance of the resistance winding 18 when $Y=.29X$.

Operation of the system to determine temperature can be carried out by two different modes of operation. In one mode, the resistance windings 18 and 23 positioned in the temperature probe or bulb are connected into the Wheatstone bridge circuit. The power input is applied across the Wheatstone bridge through potentiometer 13 and potentiometer 14. The potentiometer sliding contact 29 is moved along the potentiometer winding until the detector 24 registers zero. A zero reading indicates that the current flow through the arms of the Wheatstone bridge is balanced by movement of the sliding contact 29. The position of the sliding contact with zero reading of the detector indicates the temperature as determined by the probe including the platinum resistance windings 18 and 23. If a temperature change occurs, the resistance values of the platinum resistance windings will change, which causes a change in the current flow through the arms of the Wheatstone bridge. The net result of the current change will be noted on the detector, thus the sliding contact 29 must be moved to bring the detector back to zero or a null position. The temperature reading will then be indicated by a measure of the movement of sliding contact 29 which is indicated by some means such as a dial, a counter, or other linear means connected thereto by suitable gearing.

For the purposes of calibrating the Helipot a calibration resistor can be connected into the Wheatstone bridge circuit in place of the leads and platinum winding 23, the winding 18 with its shunt and leads being shorted out. By substituting two calibration resistors alternately at this point in the circuit, sliding contact 28 and potentiometer 15 can be adjusted to give the correct direct reading of temperatures thereafter.

The usual care should be taken to insure equality of lead resistance and to reduce heat conduction along the leads. The resistance of the leads between 21 and resistance winding 18 should be less than 0.1% of resistor 23. In the event that extreme accuracy requires that resistor 21 be thermally isolated from winding 18, then the leads to winding 18 must be somewhat in excess of those to resistance winding 23 in order to give adequate lead temperature compensation.

FIG. 2 is a modification of the circuit shown by illustration in FIG. 1. As shown, the high resolution potentiometer in the Wheatstone bridge circuit of FIG. 1 has been removed from the circuit and decade type resistances 32 and 33 have been inserted into arm 11 of the Wheatstone bridge circuit between resistor 38 and the shunt resistor 21. Each of the resistances 32 and 33 are provided with resistance elements 34 between ten fixed contacts 35 which are contacted by a rotatable contact. Rotatable contact 36 contacts the fixed contacts 35 of resistance element 32 and is connected electrically to the resistance element 33. Rotatable contact 37 of the resistance element 33 is connected electrically into the Wheatstone bridge line prior to the shunt resistor 21. Each of the movable contacts is provided with a knob and pointer for referencing the contact relative to the resistor elements 34. The pointers are moved to the correct fixed contact in order to make a null reading on the detector and the pointer indication can be calibrated to directly indicate the degrees centigrade as measured by the windings 18 and 23. As an example, the platinum windings 18 and 23, respectively, having resistance values at 0° C. of approximately 6.1 ohms and 27.8 ohms with a 10 ohm shunt resistor 21 across winding 18 will give a 0.100 ohm change in the resistors 32, 33 for each one degree centigrade change in temperature. With a resistor 38 having a resistance value of about 24 ohms in series with resistor elements 32 and 33, the pointers will read out the temperature in degrees centigrade above zero. For greater accuracy of readout, more decade resistance may be added between resistances 33 and 21.

From the above description it would be obvious to one skilled in the art that a linear pot could be put into the bridge circuit to give a direct reading and using whatever dial is already associated with the pot.

Obviously many modifications and variations of the present invention are possible in the light of the above teachings. It is therefore to be understood that within the scope of the appended claims the invention may be practiced otherwise than as specifically described.

What is claimed is:

1. A linearizing circuit for a resistance thermometer which includes a Wheatstone bridge comprising first and second electrical arms, a potentiometer connected between said arms at one end, a Helipot connected between said arms at the other end, a power source connected between said potentiometer and said Helipot, said first electrical arm comprising a fixed resistance and a changeable resistor having a coefficient of resistance which decreases with temperature, said second arm including at least one fixed resistor, a changeable resistor having a coefficient of resistance which decreases with temperature and a resistor of fixed resistance connected electrically in parallel with said changeable resistor in said second arm, said changeable resistor in said first arm having a greater resistance value than said changeable resistor in said second arm, a tubular housing with each of said changeable resistors positioned in parallel alignment within said housing and an ammeter connected between said first and second arms.

2. A linearizing circuit for a resistance thermometer which includes a Wheatstone bridge comprising first and second electrical arms, a potentiometer connected between said arms at one end, a Helipot connected between said arms at the other end, a power supply connected between said potentiometer and said Helipot, said first electrical arm comprising a fixed resistor and a changeable resistor having a coefficient of resistance which decreases with temperature, said second arm including a fixed resistor having the same value as said fixed resistor in said first electrical arm, a changeable resistor having a coefficient of resistance which decreases with temperature and a resistor of fixed resistance connected electrically in parallel with said changeable resistor in said second arm, said changeable resistor in said second arm having a resistance value less than the resistance value of said changeable resistor in said first arm, a tubular housing with each of said changeable resistors positioned in parallel alignment physically within said housing and an ammeter connected between said first and second arms.

3. A linearizing circuit for a resistance thermometer which includes a Wheatstone bridge comprising first and second electrical arms, a potentiometer connected between said first and second arms at one end thereof, a potentiometer connected between said first and second arms at the opposite ends thereof, a power source connected between said potentiometers at opposite ends of said first and second arms, said first electrical arm comprising a fixed resistor in one section and a changeable resistor having a coefficient of resistance which decreases with temperature in another section, said second arm including a fixed resistor in one section thereof corresponding to said fixed resistor in said first electrical arm, a changeable resistor having a coefficient of resistance which decreases with temperature, a resistor having a fixed resistance connected electrically in parallel with said changeable resistor in said second electrical arm, and a resistor having a fixed resistance connected in series with said resistors connected electrically in parallel, said changeable resistor in said second arm having a resistance value less than the resistance value of said changeable resistor in said first arm, a tubular housing with each of said changeable resistors positioned in parallel alignment physically within said housing and an ammeter connected between said first and second arms.

4. A linearizing circuit for a resistance thermometer as claimed in claim 3 wherein the resistance value of said changeable resistor in said second electrical arm is from about 0.22 to about 0.35 as great as the resistance value of said changeable resistor in said first arm.

5. A linearizing circuit as claimed in claim 4 wherein the resistance value of said resistor connected electrically in parallel with said changeable resistor in said second electrical arm is about six times greater than the resistance value of the changeable resistor in parallel therewith.

6. A linear resistance thermometer comprising a tubular housing, a pair of resistors having a coefficient of resistance which decreases with temperature secured physically in parallel relationship within said housing, one of said resistors having a greater resistance value than the other of said pair of resistors, a fixed resistor connected electrically in parallel with said resistor having the lesser resistance value and separate lead lines extending from said housing and connected separately to each of the resistors of said pair of resistors and adapted to connect each resistor of said pair of resistors electrically into opposite arms of Wheatstone bridge circuit.

7. A linear resistance thermometer as claimed in claim 6 in which the resistor of said pair of resistors having the lesser resistance has a resistance value from about 0.22 to about 0.35 times the resistance value of said resistor having the greater resistance.

8. A linear resistance thermometer comprising a tubular housing, a pair of resistors having a coefficient of resistance which decreases with temperature secured physically in parallel relationship within said housing, one of said pair of resistors having a greater resistance value than the other of said resistors, a resistor having a fixed resistance connected electrically in parallel with said resistor having the lesser resistance, a resistor having a fixed resistance connected in series with said resistors connected electrically in parallel and separate lead lines extending from said housing and connected separately to each of the resistors of said pair of resistors and adapted to connect each resistor of said pair of resistors electrically into opposite arms of a Wheatstone bridge circuit.

9. A linear resistance thermometer as claimed in claim 8 wherein the resistance value of said resistor connected electrically in parallel with said resistor having the lesser resistance is about six times the resistance value of the latter.

UNITED STATES PATENTS

References Cited in the file of this patent

| | | |
|---|---|---|
| 2,175,890 | Glowatski | Oct. 10, 1939 |
| 2,238,015 | Doll | Apr. 8, 1941 |
| 2,316,942 | Doll | Apr. 20, 1943 |
| 2,741,126 | Anderson et al. | Apr. 10, 1956 |
| 2,782,993 | Appelton et al. | Feb. 26, 1957 |